United States Patent [19]

Endo

[11] 4,415,118

[45] Nov. 15, 1983

[54] VEHICLE CABIN SPOT HEATER

[75] Inventor: Takuya Endo, Yokohama, Japan

[73] Assignee: Nissan Motor Co., Ltd., Kanagawa, Japan

[21] Appl. No.: 263,343

[22] Filed: May 12, 1981

[30] Foreign Application Priority Data

May 13, 1980 [JP] Japan .................................. 55-63070

[51] Int. Cl.³ ............................................ B60H 1/20
[52] U.S. Cl. ................................. 237/12.3 A; 165/10; 165/42
[58] Field of Search .......................... 165/10 A, 42, 43; 237/12.3 A

[56]  References Cited

U.S. PATENT DOCUMENTS

| | | | |
|---|---|---|---|
| 1,213,305 | 1/1917 | Verderber | 237/12.3 A |
| 1,943,108 | 1/1934 | Colby | 237/12.3 A |
| 2,155,278 | 4/1939 | Mautsch | 237/12.3 A X |
| 3,986,665 | 10/1976 | Kofink et al. | 237/12.3 A |
| 4,140,173 | 2/1979 | Wulf et al. | 237/12.3 A X |
| 4,250,866 | 2/1981 | Telkes | 126/400 X |

FOREIGN PATENT DOCUMENTS 312123  8/1971  U.S.S.R. .............................. 165/10

Primary Examiner—Albert W. Davis, Jr.
Attorney, Agent, or Firm—Lowe, King, Price & Becker

[57]  ABSTRACT

A regenerator including a heat accumulating material is disposed on an engine exhaust tube for accumulating heat given by the exhaust gas passing through the exhaust tube. An air distributor unit including an electric fan is arranged to force the air warmed by the heat accumulating material to be fed into the vehicle cabin.

8 Claims, 5 Drawing Figures

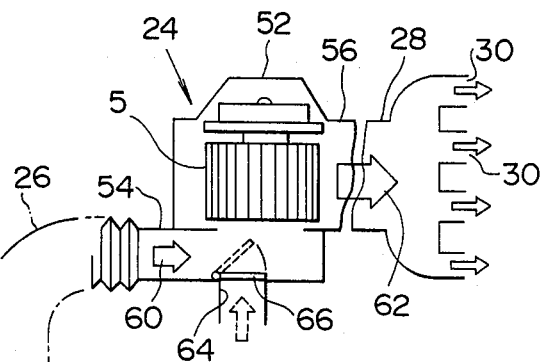
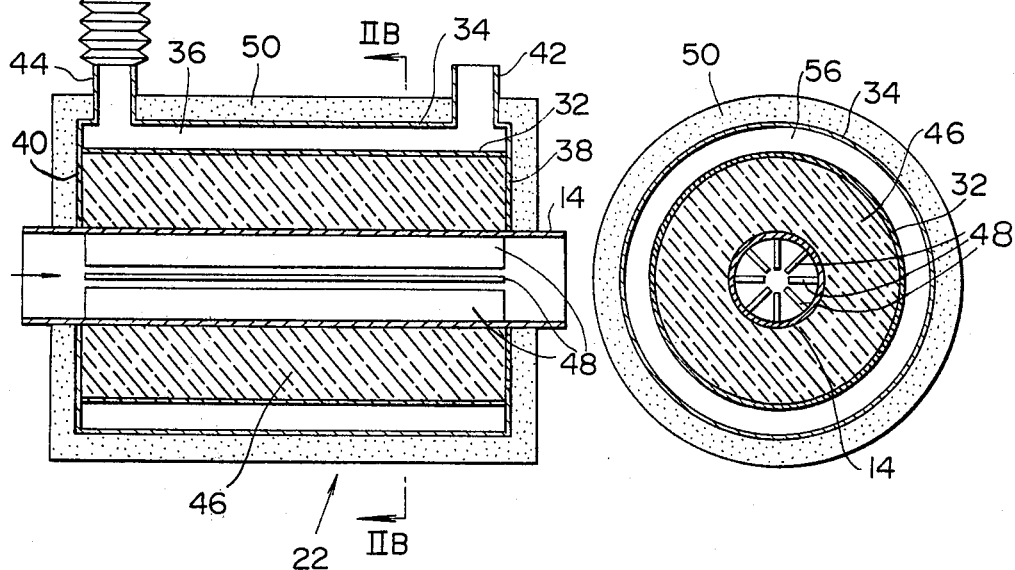

VEHICLE CABIN SPOT HEATER

BACKGROUND OF THE INVENTION

1. Field of the Invention

The present invention relates generally to a vehicle cabin heater and, more particularly, to a rapid warm-up spot heater for a motor vehicle.

2. Description of the Prior Art

Vehicle cabin heaters utilize engine cooling water as a source of heat for heating a vehicle cabin. However, in areas where ambient air temperature is often below −10° C., such heaters encounter problems in that considerable time is required to raise the temperature of engine cooling water to a sufficient level after starting the engine, requiring vehicle passengers to do without effective heating for about 15 to 20 minutes until the heater becomes normally operative.

To solve this problem, electric spot heaters have been proposed. This type of heater comprises a heater element of electrically resistant material and an electric fan and functions to heat air by electrically energizing the heater element to supply warmed air to a desired area, such as an area surrounding the driver's feet, by the action of the electric fan. With this arrangement, the vehicle passenger is given a feeling of heating.

In this type of conventional spot heater, however, a large amount of electric power is consumed due to its inherent construction. In cold areas where spot heaters are required, a large capacity battery is necessary considering the power drop of it, and the electric supply to the battery by an engine-driven generator is made by increasing the engine output to a degree greater than that actually required for cruising the vehicle, resulting in wasteful fuel consumption and noisy engine operation.

The present invention is proposed by taking the above-mentioned drawbacks into consideration.

BRIEF SUMMARY OF THE INVENTION

According to the present invention, a spot heater is mounted on an engine-driven vehicle for heating a vehicle cabin. The spot heater comprises a regenerator mounted on an exhaust tube extending from the vehicle engine. The regenerator includes a heat accumulating material for accumulating heat given by exhaust gas emitted from the engine, and a passage through which ambient air passes to be heated by the heat accumulating material. An air distributor unit is also provided and includes a housing with air inlet and outlet openings. A duct connects the passage of the regenerator with the air inlet opening of the housing. An air carrying duct is provided having one open end connected to the air outlet opening of the housing and the other open end exposed to a certain area of the vehicle cabin. An electric fan produces, when electrically energized, an air flow in a direction from the passage to the other open end of the air carrying duct through the connecting duct and the housing.

It is an essential object of the present invention to provide a rapid warm-up spot heater which can solve the problems encountered in the afore-mentioned conventional spot heater.

BRIEF DESCRIPTION OF THE DRAWINGS

Other objects and advantages of the present invention will become clear from the following description when taken in conjunction with the accompanying drawings, in which:

FIG. 2A is a sectional view of the spot heater of a first embodiment of the present invention;

FIG. 2B is a sectional view taken along the line II-B—IIB of FIG. 2A;

DETAILED DESCRIPTION OF THE INVENTION

Figure 1:
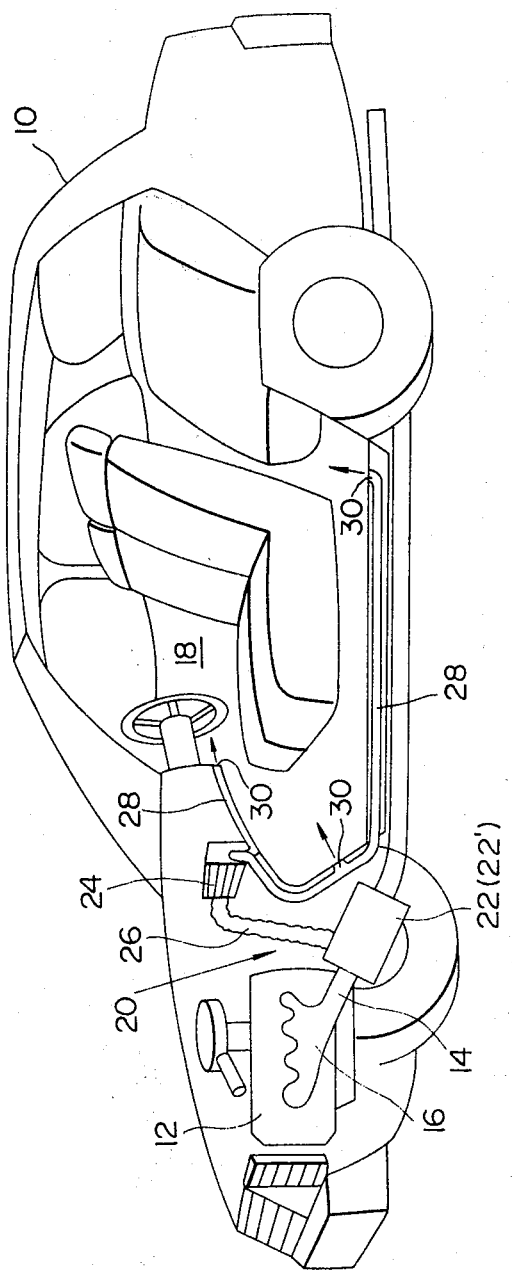
FIG. 1 is an illustration of a passenger motor vehicle in which a rapid warm-up spot heater according to the present invention is mounted.

Referring to FIG. 1 a passenger motor vehicle generally comprises a vehicle body 10, an engine 12 mounted on a front section of the body, an exhaust tube 14 extending via an exhaust manifold 16 from the engine to a rear section of the body. Body 10 includes a vehicle cabin or passenger compartment 18 which is to be warmed by a rapid warm-up spot heater 20 of the present invention.

Heater 20 of the present invention generally comprises a regenerator or heat accumulator 22 mounted exhaust tube 14 near exhaust manifold 16. An air distributor unit 24 is connected to regenerator 22 by a duct 26, and air carrying ducts 28 connected to air distributor unit 24 extend around vehicle cabin 18. Ducts 28 have air discharge openings 30 which are open to desired areas of cabin 18. As will become apparent as the description proceeds, air warmed by regenerator 22 is introduced through duct 26 into fan unit 24 far discharge from air discharge openings 30 into vehicle cabin 18.

The rapid warm-up spot heater of the first embodiment will be described in detail with reference to FIGS. 2A and 2B.

Regenerator 22 comprises a cylindrical inner metallic member 32 coaxially mounted about a portion of the exhaust tube 14, a cylindrical outer metallic member 34 coaxially disposed about the inner member in a manner to form a cylindrical clearance 36 between it and the cylindrical inner member and two circular metallic end plates 38 and 40 covering the axially opposed open ends of the inner and outer cylindrical members 32 and 34. Cylindrical outer member 34 is provided at its axially opposed end portions with air inlet and outlet tubes 42 and 44 which communicate with cylindrical clearance 36. A heat accumulating material 46 is packed in a cylindrical gap (no numeral) defined between exhaust tube 14 and the cylindrical inner member. For improving thermal transmission from the exhaust gas in exhaust tube 14 to heat accumulating material 46, a plurality of metallic fins 48 are secured to the inner surface of the exhaust tube and extend along the axis of tube 14. Preferably, the fins 48 spaced by substantially equal distances (see FIG. 2B). Cylindrical outer member 34 is covered with heat insulating material 50, such as glass wool, ceramic fiber or the like.

Air distributor unit 24 comprises a housing 52 having air inlet and outlet tubes 54 and 56, respectively. An electric fan 58 is operatively arranged in housing 52 to produce an air flow in the direction indicated by arrows 60 and 62. A fresh air inlet opening 64 is formed in housing 42 at a position near air inlet tube 54. A damper door 66 is swingably connected to housing 52 to selectively open and close opening 64.

Duct 26 connecting air distributor unit 24 to regenerator 22 is made of a heat-resisting flexible material. As shown, duct 26 connects air outlet tube 44 of regenerator 22 to air inlet tube 54 of unit 24 to provide fluid communication therebetween.

Air carrying ducts 28 are connected at their one ends to air outlet tube 56 of the unit 24.

As the heat accumulating material 46, a sensible heat type material which accumulates heat mainly in the form of thermal agitation and a latent heat type material which accumulates heat produced upon phase changes of a substance are usable in the invention.

Typical heat accumulating materials usable in the invention are shown in the next table.

TABLE (1)

|  | Heat accumulating materials |
|---|---|
| Sensible heat type materials | o Alumina ($Al_2O_3$) |
|  | o Magnesia (MgO) |
|  | o Fire resistant brick |
| Latent heat type materials | o Lithium compound (LiF—LiOH: Lithium fluoride—lithium hydroxide) |
|  | o Chloride (LiCl—KCl: Lithium chloride—potassium chloride) |
|  | o Fluoride (LiF—$MgF_2$: Lithium fluoride—magnesium fluoride) |
|  | o Hydroxide (NaOH: Sodium hydroxide) |

Among the above-shown heat accumulating materials, LiF—LiOH, LiF—$MgF_2$ and LiCl—KCl are especially suitable for the heat accumulating material since each has a melting point within a range from 350° C. to 750° C. to which engine exhaust gas is heated quite often.

In the following, operation of the spot heater of the present invention will be described.

At cruising of the vehicle, a heat exchange takes place between the engine exhaust gas and heat accumulating material 46 with the result that a considerable amount of heat is accumulated in the heat accumulating material in the form of latent or sensible heat. Assuming that eutectic salt of lithium fluoride and lithium hydroxide is used for the heat accumulating material, having a volume of 2.5 liter and is heated to 500° C. by engine exhaust gas, the amount of heat accumulated by the salt is calculated at about 2000 kcal when considering that the lower limit of temperature usable for heating is 100° C. Assuming that regenerator 22 thus accumulating the heat is left in an open air of —10° C. all night long (10 hours), it is expected that heat accumulating material 46 is still kept warmed at about 220° C. until the next morning. In a term while the heat accumulating material is cooled from the temperature of 220° C. to that of 100° C., it is estimated that about 270 kcal of heat has been discharged from the material for heating.

Thus even when the temperature of engine cooling water is low at the time of engine starting, causing the water to be unsuitable for heatng, switching on the spot heater to induce rotational operation of fan 58 causes hot air, which is warmed by regenerator 22, to be blown from air discharge openings 30 to the desired areas of the vehicle cabin 18, such as areas surrounding the passenger's feet, the driver's hands gripping a steering wheel. With this, the passengers are given at least a feeling of heating.

The temperature of the warmed air fed to cabin 18 is readily controlled by handling damper door 66. When the temperature of warmed air is higher than that comfortably felt by the passengers, damper door 66 is opened to a suitable degree to cause an ambient cool air to be fed into air distributor unit 24 to cool the warmed air which is to be fed into vehicle cabin 18.

Figure 3A:
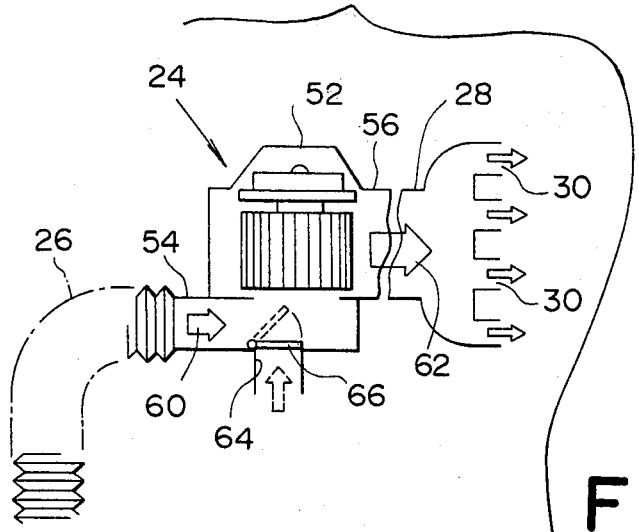
FIG. 3A is a view similar to FIG. 2A, but shows a second embodiment of the present invention.
Figure 3B:
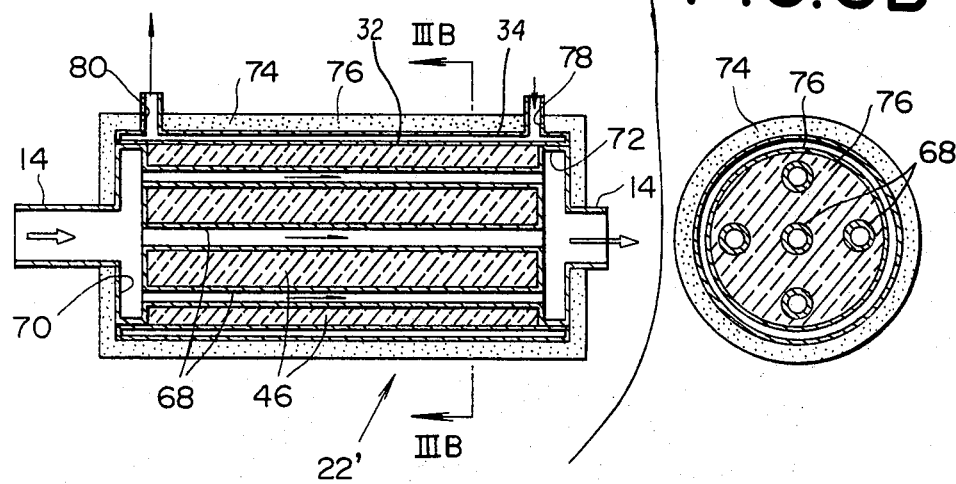
FIG. 3B is a sectional view taken along the line III-B—IIIB of FIG. 3A.

Referring to FIGS. 3A and 3B, a second embodiment of the present invention is illustrated, having the same construction as the above-mentioned first embodiment of FIGS. 2A and 2B, except for the regenerator.

Regenerator 22' of the second embodiment comprises a plurality of metallic tubes 68 which are spanned between two metallic chamber members 70 and 72 in a manner to connect the interiors of members 70 and 72. Chamber member 70 is connected to engine 12 proper through exhaust tube 14. Metallic tubes 68 are embedded in a cylindrically-shaped heat accumulating material 46 which is one of the materials shown in the aforementioned TABLE-(1). A cylindrical heat insulating outer member 74 is coaxially disposed about cylindrical heat accumulating material 46 in a manner to form a cylindrical clearance 76 therebetween. Outer member 74 is formed at its axially opposed end portions with air inlet and outlet portions 78 and 80. Outlet portion 80 is connected to air distributor unit 24 through duct 26, similar to the case of the first embodiment.

As has been explained in the foregoing description, the spot heater according to the present invention is so constructed that the heat for completing the spot heating of vehicle cabin is given by a heat which has been accumulated in a regenerator by carrying out the heat exchange between the heat accumulating material of the regenerator and the exhaust gas emitted from the engine proper. Thus, according to the present invention, rapid (but spot) heating of the vehicle cabin is available even when the temperature of the engine cooling water is not high enough for heating the vehicle cabin as in a case that the engine is just in starting.

What is claimed is:

1. A spot heater mounted on an engine-driven vehicle for preheating a vehicle cabin, comprising:
   a regenerator mounted on an exhaust tube of said engine, said regenerator including a heat accumulating material substantially completely surrounding and intimately disposed about a portion of said exhaust tube to accumulate heat given off by exhaust gas passing through said exhaust tube, and casing means disposed coaxially about said heat accumulating material and said exhaust tube portion in a spaced, contact-free relationship with the material, to define an air conducting clearance extending continuously about and immediately adjacent said heat accumulating material for preheating the cabin,
   said casing means further including an inner wall member located between the clearance and heat accumulating material to isolate said tube from the clearance;
   inlet and outlet tubes in communication with the continuous clearance established within said casing means, said inlet and outlet tubes being spaced axially to said casing means, and
   an air distributor unit including a housing with air inlet and outlet openings, a connecting duct connecting the outlet tube of the regenerator with the air inlet opening of said housing, an air carrying duct having one end connected to said air outlet opening of said housing and the other end exposed to a certain area of said vehicle cabin, and means for producing an air stream flowing from the inlet tube of the regenerator to the other end of said air carrying duct through said clearance, said connecting duct and said air carrying duct.

2. A spot heater as claimed in claim 1 wherein said housing has an additional opening closable by a damper door, enabling ambient air to be introduced into the housing when said damper door opens.

3. A spot heater as claimed in claim 1, wherein said casing further includes:
    said cylindrical inner member coaxially mounted about a portion of said exhaust tube;
    a cylindrical outer member coaxially disposed about said inner member to form therebetween a cylindrical clearance which acts as said passage;
    two circular end plates covering the axially opposed open ends of said inner and outer members;
    air inlet and outlet openings formed in said cylindrical outer member to communicate with said cylindrical clearance, said air inlet opening being open to the open air and said air outlet opening being connected to said connecting duct; and
    a heat insulating material covering the outer surface of said cylindrical outer member,
    said heat accumulating material being packed in a cylindrical spaced defined between the portion of said exhaust tube and said cylindrical inner member.

4. A spot heater as claimed in claim 3, wherein said regenerator further includes a plurality of fins secured to said inner surface of the portion of the exhaust tube to extend longitudinally within said tube.

5. A spot heater as claimed in claim 4, wherein said fins are equi-spaced from each other.

6. A spot heater as claimed in claim 1 wherein said regenerator further includes:
    a plurality of tubes arranged substantially parallel with each other and embedded in said heat accumulating material which is formed into a cylindrical shape;
    two chamber members the interiors of which are interconnected by said tubes, said tubes and chamber members being disposed in the portion of said exhaust tube to enable exhaust gas from the engine to pass through said tubes;
    a cylindrical heat insulating member coaxially disposed about the cylindrical-shaped heat accumulating material to form a cylindrical clearance therebetween; and
    air inlet and outlet openings formed in said heat insulating member to communicate with said cylindrical clearance, said air inlet opening being open to ambient air and said air outlet opening being connected to said connecting duct.

7. A spot heater as claimed in claim 1, wherein said heat accumulating material is selected from the group of materials consisting of Alumina ($Al_2O_3$), Magnesia (MgO) and fire resistant brick.

8. A spot heater as claimed in claim 1, wherein said heat accumulating material of said regenerator is selected from the group of materials consisting of Lithium fluoride-Lithium hydroxide (LiF-LiOH), Lithium chloride-potassium chloride (LiCl-KCl), Lithium fluoride-Magnesium fluoride ($LiF-MgF_2$) and Sodium hydroxide (NaOH).

* * * * *